(12) United States Patent
Face, III

(10) Patent No.: US 6,782,631 B1
(45) Date of Patent: Aug. 31, 2004

(54) MOVABLE PLATFORM FOR USE WITH SURFACE PROFILING SYSTEM

(75) Inventor: S. Allen Face, III, Wilmington, NC (US)

(73) Assignee: Allen Face and Company LC, Wilmington, NC (US)

( * ) Notice: Subject to any disclaimer, the term of this patent is extended or adjusted under 35 U.S.C. 154(b) by 0 days.

(21) Appl. No.: 10/639,555

(22) Filed: Aug. 12, 2003

(51) Int. Cl.$^7$ .................. G01B 21/30; E01C 23/01
(52) U.S. Cl. ............... 33/533; 33/501.02; 33/521
(58) Field of Search ............... 33/501.02, 501.03, 33/521, 523, 533, 546, 551–554

(56) References Cited

U.S. PATENT DOCUMENTS

| | | | | |
|---|---|---|---|---|
| 2,335,390 A | * | 11/1943 | Crist ........................... | 73/105 |
| 3,026,164 A | * | 3/1962 | Lancerini ..................... | 33/775 |
| 3,056,209 A | | 10/1962 | Oliver ......................... | 33/523 |
| 4,084,324 A | * | 4/1978 | Whitehouse ................. | 33/545 |
| 4,403,419 A | * | 9/1983 | Graves ........................ | 33/523 |
| 4,577,494 A | * | 3/1986 | Jaeggi ......................... | 33/552 |
| 5,535,143 A | | 7/1996 | Face ........................... | 702/165 |
| 6,508,008 B2 | * | 1/2003 | Suzuki et al. ................ | 33/521 |
| 6,647,636 B2 | * | 11/2003 | Fukuhara et al. ............. | 33/521 |
| 2002/0007562 A1 | * | 1/2002 | Kumazawa et al. .......... | 33/533 |
| 2003/0074801 A1 | * | 4/2003 | Funke ......................... | 33/501.02 |

* cited by examiner

*Primary Examiner*—G. Bradley Bennett
(74) *Attorney, Agent, or Firm*—Peter J. Van Bergen

(57) ABSTRACT

A movable platform is provided for use with a surface profiling system. The platform eliminates all errors associated with wheel inconsistencies. A frame is supported above a surface by, among other supports, three supports arranged in a linear alignment that defines a direction of travel for the frame. The three supports are defined by a front support, a rear support and a center support centered between the front support and rear support. The center support is a floating support capable of substantially vertical movement. At least two of the front support, rear support and center support are wheels configured to roll in the direction of travel defined by the three supports that are linearly aligned. These wheels are coupled to one another for synchronizing rolling movement thereof on the surface.

20 Claims, 6 Drawing Sheets

MOVABLE PLATFORM FOR USE WITH SURFACE PROFILING SYSTEM

FIELD OF THE INVENTION

The invention relates generally to movable support platforms, and more particularly to a movable support platform for use with a surface profiling system.

BACKGROUND OF THE INVENTION

Rolling surface profiling apparatus have been used for some time to measure the profile or contour of a material surface, floor, road, etc. For example, U.S. Pat. No. 3,056,209 issued to Robert E. Oliver on Oct. 2, 1962, discloses a three-wheel, continuous recording, analog computation device that endeavors to accurately measure the contours of a surface with respect to a reference plane by the use of a "floating" center wheel which produces a vertical displacement signal with respect to the distance traveled over the surface by a double integration procedure. Equations 1 through 4 in the Oliver patent describe the geometrical and mathematical relationships between the measured and desired quantities that make such a device theoretically possible. However, the reference notes that it is necessary to consider stability problems and proceeds to change the ideal coefficients given in Equation 4 to certain values which the patentee found, through experience, to yield satisfactory results. The patentee justifies the abandonment of the ideal mathematical model as necessary to overcome serious problems of noise compounding that is inherent in all such integration devices.

A three-wheel rolling digital surface measurement apparatus is disclosed by Allen Face in U.S. Pat. No. 5,535,143. Similar to the Oliver patent, three collinear, sequentially oriented, regularly spaced and approximately equi-diameter wheels are provided on one side of a measurement platform. The middle wheel is a floating wheel having a linear position transducer coupled thereto. The rear wheel has an odometer coupled thereto. On-center spacing between each adjacent pair of wheels is given as S.

More specifically, the device of U.S. Pat. No. 5,535,143, illustrated schematically in FIG. 1, includes a rigid frame 2 rotatably supporting a rear wheel 3 and a front wheel 4 that are co-linear and separated by the distance 2S. Support wheels 3 and 4 contact the measured surface 1 at points i and i-2, respectively. Midway between support wheels 3 and 4, a sensing wheel 5 is in contact with surface 1 at point i-1. Sensing wheel 5 supports an axially movable column 6 that is connected to frame 2 in such a manner that its movement relative to frame 2 is restricted to an axis normal to the line joining the centers of wheels 3 and 4. A linear position transducer 7 having an output signal R is mounted on frame 2 in such a manner that its electrical output is directly proportional to the position of column 6 relative to frame 2. An odometer 8 is mounted on frame 2 to produce an electrical signal D that is directly proportional to the distance traveled by rear wheel 3 across surface 1. The linear position transducer signal R and odometer signal D are both input to a digital computer 9 which is programmed to interpret the two signals and record the instantaneous position, in convenient dimensions, of column 6 relative to frame 2 every time rear wheel 3 travels the distance S across surface 1. All of the above named individual components, as well as the electrical powering apparatus (not shown) required for the apparatus, are commercially available items. Similarly configured surface curvature measurement devices have long been known to those skilled in the art.

In accordance with the teachings of U.S. Pat. No. 5,535,143, each wheel will contact the measured surface at that point where the tangent to the wheel and the tangent to the surface coincide. Due to the undulation of the measured surface, the line connecting the center of each wheel and its associated contact point will rarely be perpendicular to the elevation datum. While the computer of this invention assumes that every reading point will fall on a normal from the wheel center to the elevation datum, in actuality, most of the reading points will be slightly displaced from the assumed position owing to the wheel surface contact geometry.

The computer of this invention records the column position transducer signal at the instant the odometer indicates that the rear wheel has traveled the distance S. However, between successive reading points, the rear wheel is not traveling in a straight line, but along an undulating surface. Thus, while the computer assumes that the horizontal displacement between successive readings is the constant distance S, in actuality the straight line distance between each successive reading will vary slightly according to the length of the undulating surface profile over which the real wheel travels.

The odometer triggering thus necessarily results in a slightly variable reading point spacing. Accordingly, the sensor wheel and front wheel contact points at one reading position will rarely coincide exactly with the rear wheel and sensor wheel contact points at the next reading position.

To be perfectly accurate, each measurement would have to contain an infinity of decimal places. Since the number of digits carried by the computer is finite, there is a rounding error introduced when the decimal infinity of the true measurement distance to the right of the last computer carried digit is dropped. Thus, the computer rounds the last carried digit up or down depending upon the value of the leftmost dropped digit. When the leftmost dropped digit is below 5, the computer rounds down thereby understating the true measurement and when the leftmost dropped digit is 5 or more, the computer rounds up thereby overstating the true measurement.

In addition to the reading point positioning and rounding problems described above, as a consequence of the physical imperfections inherent in the construction of the device, there will be a fixed characteristic error associated with each one of the finite number of possible column position transducer reading states. In addition to having a fixed characteristic error component, each column position transducer reading will also contain a completely random noise error. U.S. Pat. No. 5,535,143 goes on to describe a fairly complex mathematical relationship for dealing with these errors. However, there is another source of error not recognized, and therefore not addressed, by the any of the prior art surface profilers. Specifically, all surface profilers assume that the profiler's wheels are the same diameter. However, since no two wheels are ever truly identical in size (due to manufacturing differences), one revolution of a profiler's center (transducer) wheel will never cover the same distance as one revolution of its rear (odometer) wheel. Thus, even if the measurement platform is rolled in a straight line, measurement points will never be in exact coincidence as the measurement apparatus is rolled over a surface. Although this is a small incremental error, the effects of compounding can lead to inaccurate surface measurement over longer measurement runs. This is a substantial problem in the case of road surface profiling where a measurement run is on the order of a quarter mile or longer.

SUMMARY OF THE INVENTION

Accordingly, it is an object of the present invention to provide a movable platform that can be used as the measurement platform for a surface profiling system.

Another object of the present invention to provide a movable platform for use as part of a rolling digital surface profiling system.

Still another object of the present invention to provide a movable platform having regularly spaced and collinearly aligned wheels that guarantees alignment between subsequent surface contact points for each wheel revolution.

Other objects and advantages of the present invention will become more obvious hereinafter in the specification and drawings.

In accordance with the present invention, a movable platform has a frame for supporting a surface measurement system thereon. At least four supports are coupled to the frame and contact a surface so that the frame is supported above the surface. A first three of the supports are arranged in a linear alignment that defines a direction of travel for the frame, while a remainder of the supports are spaced apart from the linear alignment. The first three supports are defined by a front support, a rear support and a center support centered between the front support and rear support. The center support is a floating support capable of substantially vertical movement. At least two of the front support, rear support and center support are wheels configured to roll in the direction of travel defined by the three supports that are linearly aligned. Synchronization means are coupled to these wheels for synchronizing rolling movement thereof on the surface.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
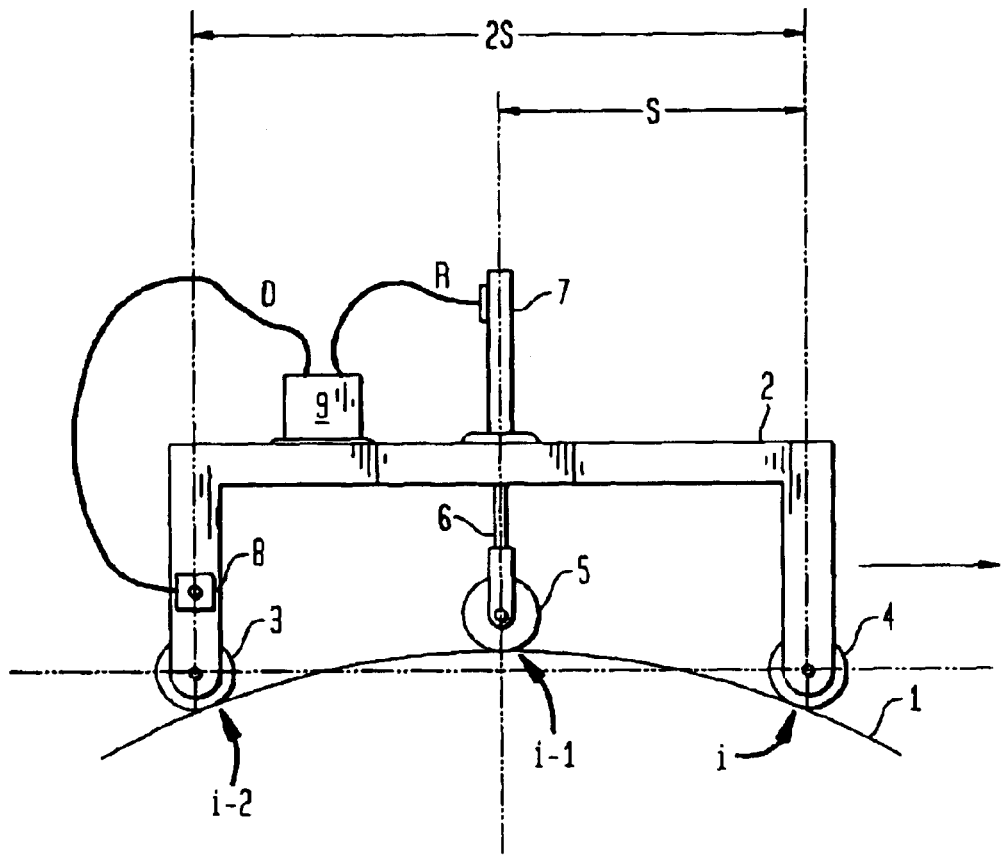
FIG. 1 is a schematic view of a prior art rolling digital surface profiling apparatus.
Figure 2:
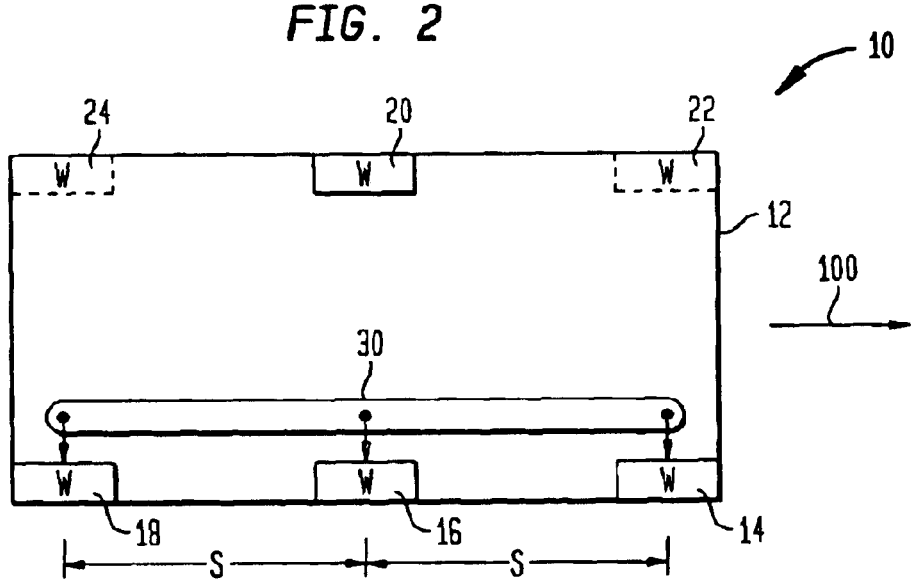
FIG. 2 is a schematic plan view of the underside of a movable platform and its support system used to support a surface profiling system in accordance with an embodiment of the present invention.

Referring now to the drawings, and more particularly to FIG. 2, a plan view of a movable platform having a support system is illustrated and referenced generally by numeral 10. Movable platform 10 supports a surface profiling system (not shown in FIG. 2) that, when coupled to movable platform 10, can profile the contours of a hard surface (e.g., concrete floor, road bed, etc.) along a linear direction of travel indicated by, for example, arrow 100. It is to be understood that the choice of surface profiling system and methodology is not a limitation of the present invention. That is, movable platform 10 can be used with either of the surface profiling approaches in the previously-described U.S. Pat. Nos. 3,056,209 and 5,535,143, as well as any of the approaches cited thereby or known to one of ordinary skill in the art. By using movable platform 10, errors associated with the wheel diameter inconsistencies are eliminated. However, it is to be understood that if the particular choice of surface profiling system has other sources of measurement or calculation errors, used of movable platform 10 will neither magnify or reduce such errors.

In FIG. 2, movable platform 10 is illustrated from the underside thereof to illustrate the support system therefor. More specifically, movable platform 10 has a frame 12 supported by a plurality of support wheels to include at least four wheels 14, 16, 18 and 20, each of which is indicated by a "W". Wheels 14, 16 and 18 are three co-linearly arranged wheels with wheel 16 centered between wheels 14 and 16 and separated from each of wheels 14 and 18 by a distance S. Wheels 14, 16 and 18 are aligned rotationally to define a linear direction of travel (such as that defined by arrow 100) when movable platform 10 is moved on a surface. Center wheel 16 is further configured to move vertically (i.e., into and out of the page for the view illustrated in FIG. 2) or substantially vertically in coincidence with the contour of the surface on which movable platform 10 rests. Wheels 14 and 18 are constrained from such vertical movement. This co-linear arrangement of wheels 14, 16 and 18 is the same as that described in U.S. Pat. No. 5,535,143, the contents of which are hereby incorporated by reference.

Figure 3:
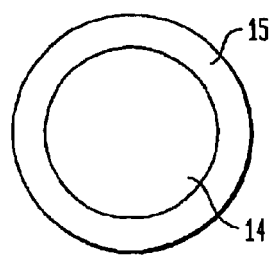
FIG. 3 is an isolated side view of one of the movable platform's support wheels with a rubber tire mounted thereon.

Spaced apart from co-linearly arranged wheels 14, 16 and 18 is wheel 20 which is also aligned for rotation that is coincident with direction of travel 100. Wheel 20 is provided to balance movable platform 10. Wheel 20 could also be replaced or supplemented with additional wheels such as wheels 22 and 24 illustrated in phantom. Each of the above-described wheels is rigid and typically has a solid rubber tire mounted thereon for contacting a surface. For example, FIG. 3 illustrates wheel 14 having a solid rubber tire 15 mounted thereon.

In accordance with the present invention, wheels 14, 16 and 18 are coupled to one another such that their rotational movement is synchronized. That is, one full rotation of wheel 14 translates into one full rotation of each of wheels 16 and 18 irrespective of any size differences between the wheels. Such synchronized rotational movement is illustrated schematically by an endless loop 30 coupled to each of wheels 14, 16 and 18. In implementation, such synchronization can be realized in a variety of ways without departing from the scope of the present invention. Several synchronization approaches will be described below.

Figure 4:
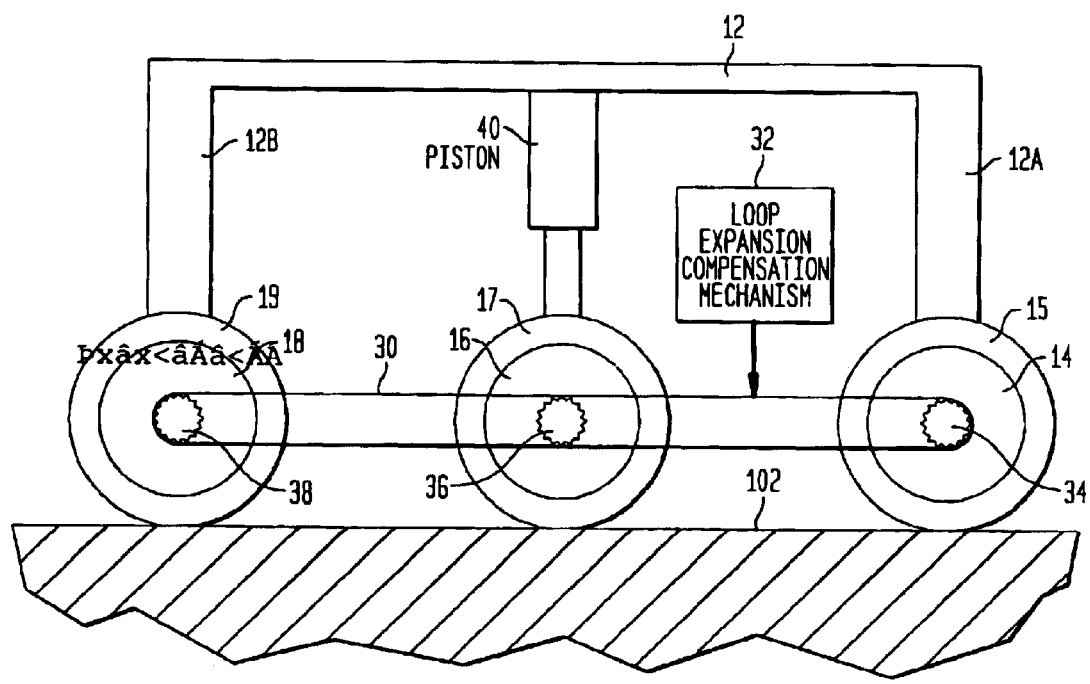
FIG. 4 is a schematic side view of the movable platform's three collinearly aligned wheels configured for synchronized rotational movement in accordance with an embodiment of the present invention.

In FIG. 4, wheels 14, 16 and 18 having respective rubber tires 15, 17 and 19 mounted thereof are shown in a side view. For this embodiment, it is assumed that each of wheels 14 and 18 is independently mounted to frame 12 that they help support by means of supports 12A and 12B. Fixably mounted on each of wheels 14, 16 and 18 is a respective gear wheel 34, 36 and 38 such that each wheel/gear combination shares a common axis of rotation whereby rotation of the wheel translates into rotation of the gear wheel. Coupled to each gear wheel is an endless loop 30 in the form of a chain or belt for engagement with each of gear wheels 34, 36 and 38.

As mentioned above, wheel 16 is configured for vertical movement as it rolls over a surface 102. For example, wheel 16 could be coupled to frame 12 via a piston 40 that allows wheel 16 to move vertically with a changing profile of a surface 102 on which wheel 16 rolls. To provide for such vertical movement while maintaining wheel synchronization, endless loop 30 can incorporate a loop expansion compensation mechanism 32 that allows loop 30 to expand (with vertical movement of wheel 16) while maintaining tension in loop 30 such that wheels 14, 16 and 18 remain in synchronization at all times. Loop expansion compensation mechanism 32 can be realized-by any of a variety of devices/mechanisms, the choice of which is not a limitation of the present invention. For example, mechanism 32 could be constructed using a series of spring-loaded gears (not shown) receiving therethrough a slack amount of loop 30 that is paid out when wheel 16 moves vertically and retracted when wheel 16 returns to its neutral position, i.e., the point at which the axes of rotation of wheels 14, 16 and 18 are collinear.

Figure 5:
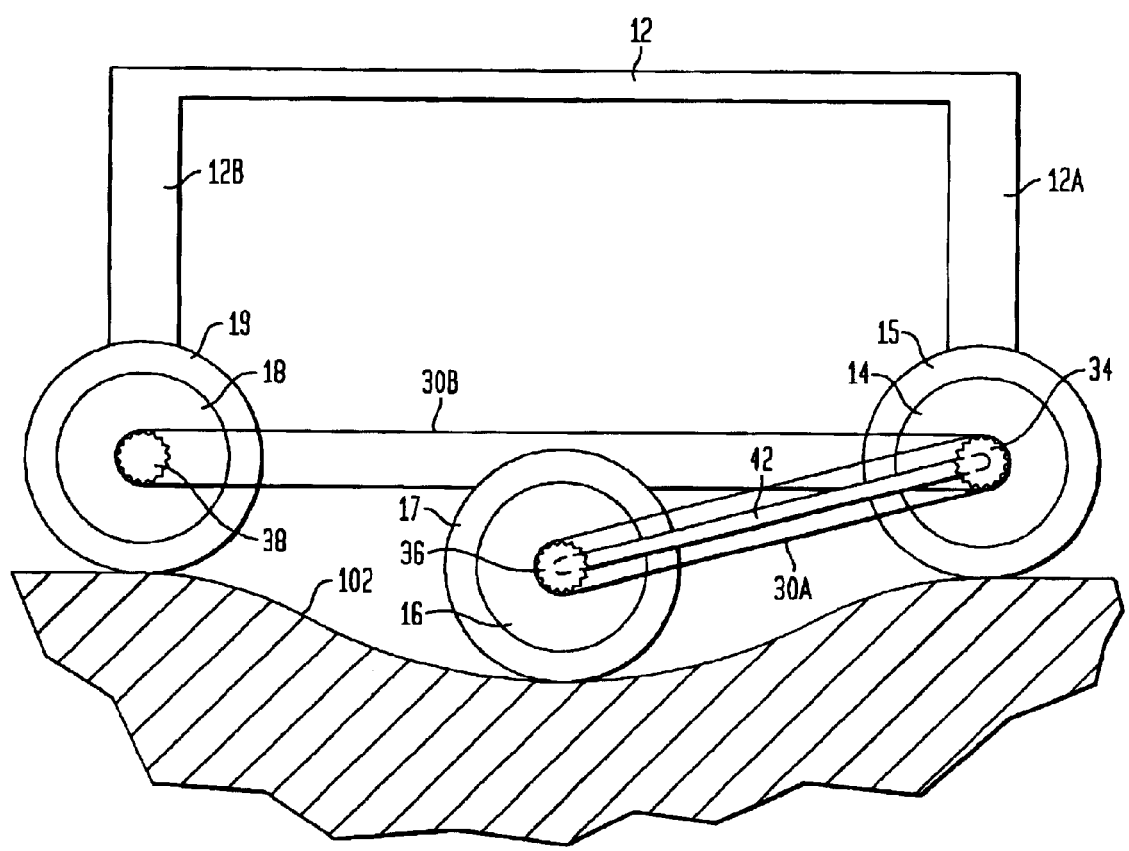
FIG. 5 is a schematic side view of the movable platform's three collinearly aligned wheels in accordance with another embodiment of the present invention.

Another way for wheel synchronization to be achieved is illustrated in FIG. 5 where wheel 16 is coupled to wheel 14 by means of a radial arm 42 that is pivotable about the axis of rotation of wheel 14 while wheel 16 is rotatably mounted to the other end of arm 42. As wheel 16 moves over surface 102, contours in surface 102 (which has been greatly exaggerated in FIG. 5 in order to illustrate the particular embodiment) cause wheel 16 to move up and down along an arc defined by radial arm 42. Since the amount of contour between wheels 14 and 16 is generally relatively small, contour following movement of wheel 16 is substantially vertical. Extraction of the vertical component associated with movement of wheel 16 along the radial arc is a straightforward geometrical operation that would be well understood by one of ordinary skill in the art. Wheel synchronization in this embodiment is achieved by using two endless loops 30A and 30B. More specifically, loop 30A engages gear wheels 34 and 36 while loop 30B engages gear wheels 34 and 38. Note that gear wheel 34 may be enlarged in width or be embodied by two gear wheels to accommodate both loops 30A and 30B as would be understood by one skilled in the art.

Figure 6:
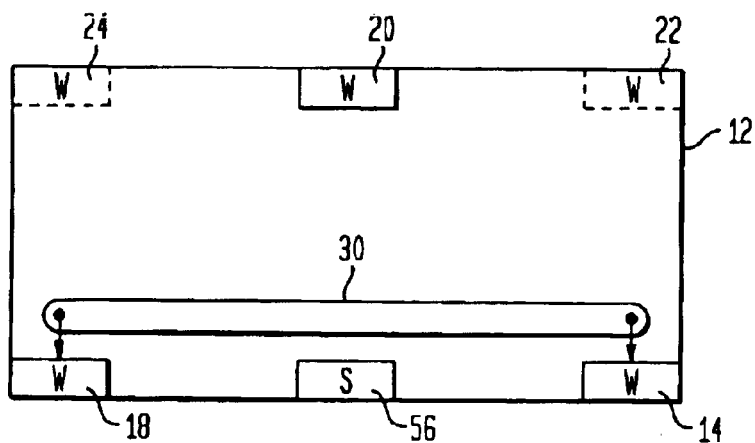
FIG. 6 is a schematic plan view of the underside of the movable platform and its support system in accordance with another embodiment of the present invention.
Figure 7:
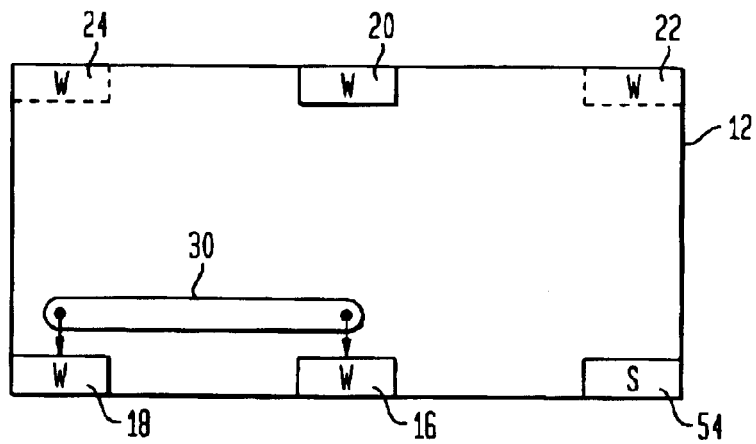
FIG. 7 is a schematic plan view of the underside of the movable platform and its support system in accordance with still another embodiment of the present invention.
Figure 8:
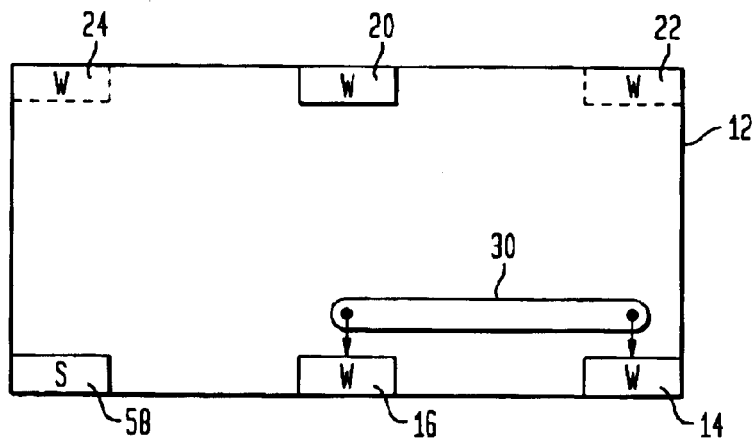
FIG. 8 is a schematic plan view of the underside of the movable platform and its support system in accordance with yet another embodiment of the present invention.
Figure 9:
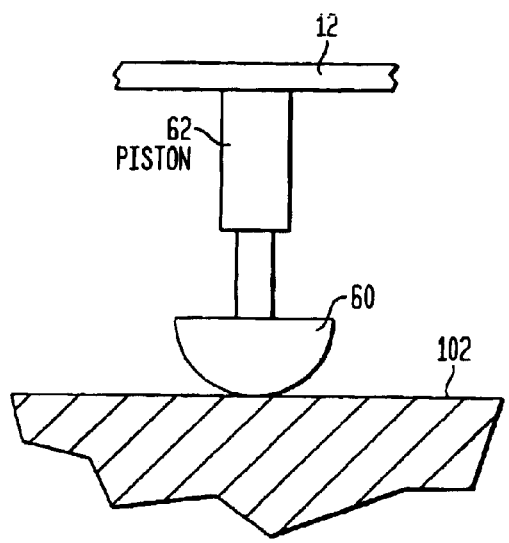
FIG. 9 is an isolated side view of a slide used for the center one of the collinearly aligned supports illustrated schematically in FIG. 6.

Although the present invention has been described using three collinearly aligned wheels, it is not so limited. For example, in each of FIGS. 6–8, one of the collinearly aligned wheels is replaced with a support "S" that slides on the surface on which the movable platform rests. For example, in FIG. 6, center wheel 16 (FIG. 2) has been replaced with a support 56 that slides on the surface as wheels 14 and 18 are rolled thereover. In this case, only wheels 14 and 18 are synchronized by endless loop 30. By way of example, support 56 can be realized as illustrated in FIG. 9 where a semi-circularly shaped sled 60 is coupled to frame 12 by a, piston 62 that allows sled 60 to move vertically in coincidence with the contour of surface 102. The surface of sled 60 contacting surface 102 should present a durable low-friction interface. Examples of suitable materials include ceramics, carbides, etc. In FIGS. 7 and 8, wheels 14 and 18 are replaced with sliding supports 54 and 58, respectively. Construction of supports 54 and 58 can be similar to that of sled 60.

Figure 10:
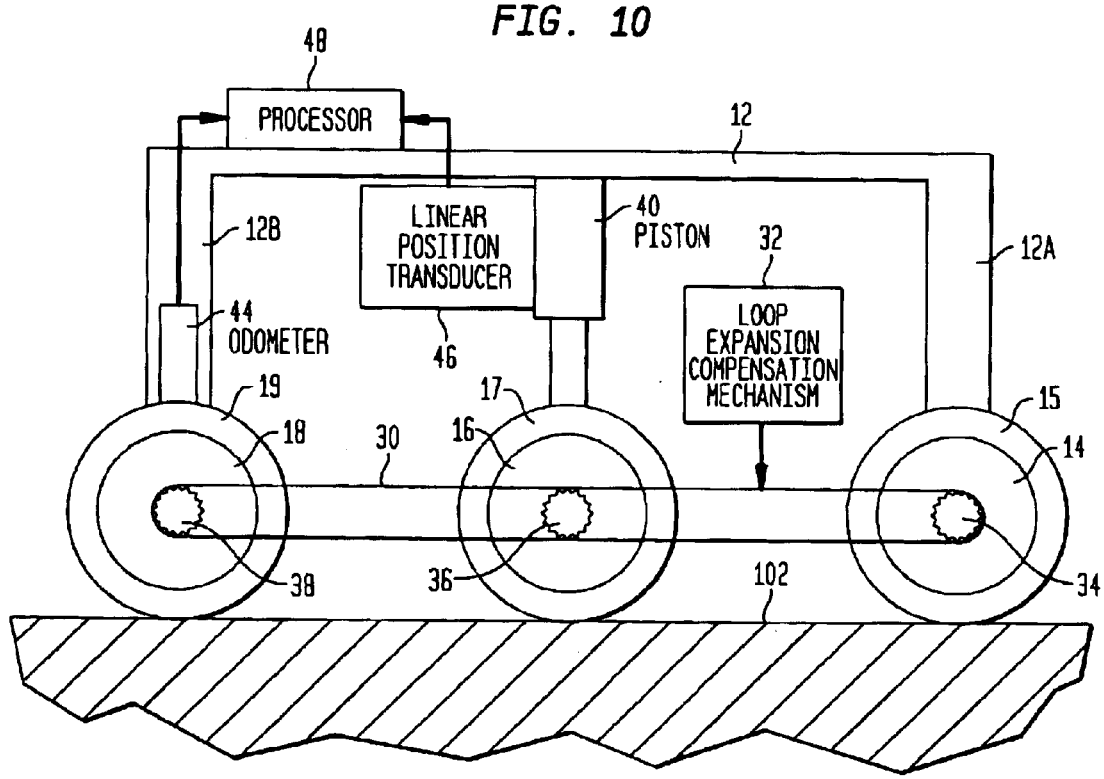
FIG. 10 is a schematic side view of the movable platform in FIG. 4 further equipped for generating a surface profile of a surface over which it moves.

In each of the above embodiments, the present invention's movable platform will support a surface profiling system. Accordingly, one of the collinearly aligned wheels (i.e., 14, 16 or 18) must have an odometer coupled thereto to measure distance traveled for each rotation of the synchronized wheels. For example, based on the FIG. 4 embodiment, FIG. 10 illustrates an odometer 44 (mounted on frame support 12B) that will produce a signal at each rotation of wheel 18 that is essentially indicative of the distance traveled by wheel 18 across surface 102. Since wheels 14 and 16 are rotationally synchronized to wheel 18, the distance traveled by each wheel will be identical. Piston 40 can have a linear position transducer 46 coupled thereto that produces a signal indicative of the vertical movement of wheel 16. The outputs from odometer 44 and transducer 46 are supplied to a processor 48 that uses these signals to determine the contoured profile of surface 102 in accordance with one of the known surface profiling approaches discussed above.

Figure 11:
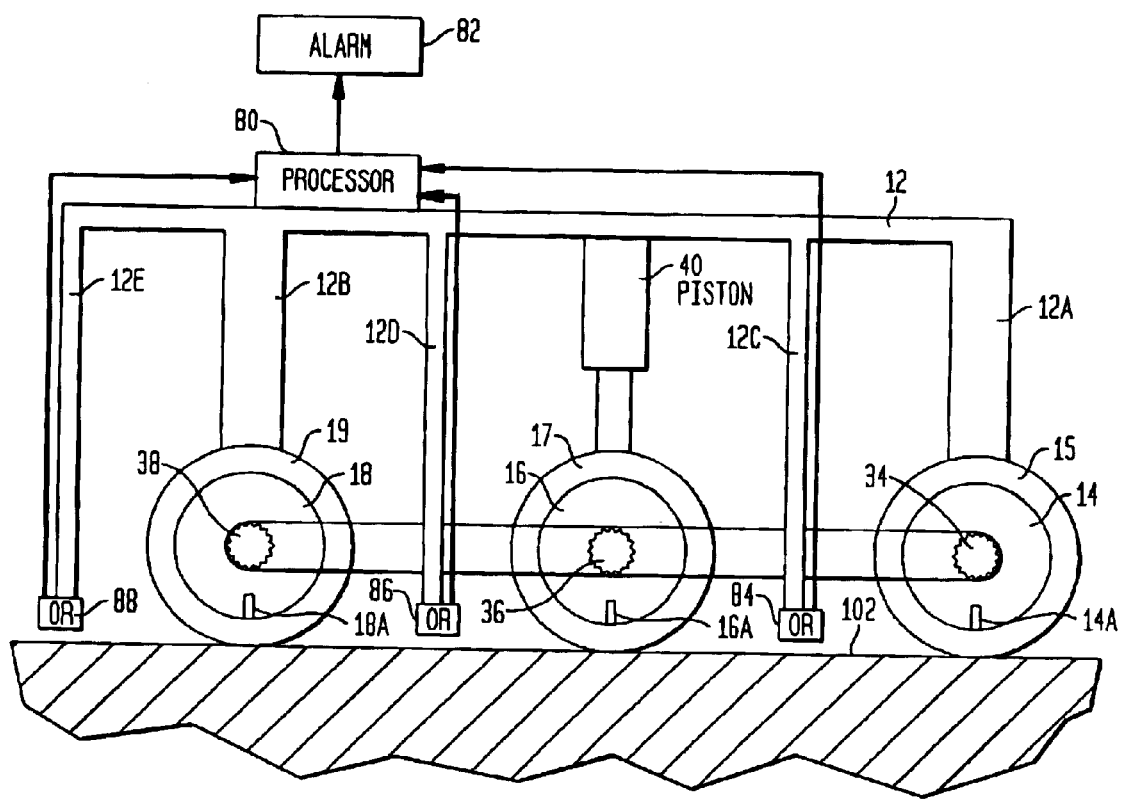
FIG. 11 is a schematic side view of the movable platform in FIG. 4 further equipped for evaluation of wheel synchronization.

If it is desired to periodically check the integrity of the above-described wheel synchronization, each of the synchronized wheels can have a mark placed thereon at the same rotational position. This is illustrated in FIG. 11 where each of wheels 14, 16 and 18 has marks 14A, 16A and 18A placed thereon at the six o'clock position. If wheels 14, 16 and 18 go out of synchronization, so will these marks. Thus, a check on the position of the marks provides an indication of the relative positions of the wheels. This check can be performed manually (visually) or by means of an automatic system. For example, if each of marks 14A, 16A and 18A were reflective, optical readers ("OR") 84, 86 and 88 could be mounted on frame 12 (via supports 12C, 12D and 12E, respectively) and focused on the six o'clock position. Readers 84, 86 and 88 could be coupled to a processor 80 that checked for coincidence of the marks and issued an alarm via alarm 82 if such coincidence were not found.

The advantages of the present invention are numerous. The movable platform provides a rolling support base for a surface profiling system that eliminates all errors associated with wheel inconsistencies. Accordingly, surface profiling of long concrete floors and paved roads is made more robust than ever before.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A movable platform, comprising:
   a frame for supporting a surface measurement system thereon;
   at least four supports coupled to said frame and contacting a surface wherein said frame is supported above said surface;
   a first three of said at least four supports being arranged in a linear alignment that defines a direction of travel for said frame, and a remainder of said at least four supports being spaced apart from said linear alignment;
   said first three defined by a front support, a rear support and a center support centered between said front support and said rear support;
   said center support being a floating support capable of substantially vertical movement;
   at least two of said front support, said rear support and said center support being wheels configured to roll in said direction of travel; and
   means coupled to said wheels for synchronizing rolling movement thereof on said surface.

2. A movable platform as in claim 1 wherein all of said at least four supports are wheels.

3. A movable platform as in claim 1 wherein two of said front support, said rear support and said center support are wheels, and wherein a remaining one of said front support, said rear support and said center support is a support that slides on said surface.

4. A movable platform as in claim 1 wherein each of said wheels is rigid and has a solid rubber tire mounted on the circumference thereof.

5. A movable platform as in claim 1 further comprising means for indicating relative positions of each of said wheels.

6. A movable platform as in claim 1 further comprising means coupled to said center support for measuring said substantially vertical movement thereof.

7. A movable platform as in claim 1 further comprising an odometer coupled to one of said wheels.

8. A movable platform as in claim 1 wherein said means for synchronizing comprises:
   a gear wheel coupled to each of said wheels for corresponding rotation therewith; and
   an endless loop coupled to each said gear wheel wherein rotation of each said gear wheel causes corresponding movement of said endless loop.

9. A movable platform, comprising:
   a frame;
   at least four supports coupled to said frame and contacting a surface wherein said frame is supported above said surface;
   a first three of said at least four supports being arranged in a linear alignment that defines a direction of travel for said frame, and a remainder of said at least four supports being spaced apart from said linear alignment;
   said first three defined by a front support, a rear support and a center support centered between said front support and said rear support;
   said center support being a floating support capable of substantially vertical movement;
   a sensor coupled to said center support for measuring a vertical component of said substantially vertical movement and for generating a signal indicative thereof;
   at least two of said front support, said rear support and said center support being wheels configured to roll in said direction of travel;
   an odometer coupled to one of said wheels for measuring a distance traveled on said surface caused by each rotation of said one of said wheels and for generating a signal indicative of said distance traveled; and
   means coupled to said wheels for synchronizing rotation thereof wherein said distance traveled by said one of said wheels is the same for remaining ones of said wheels.

10. A movable platform as in claim 9 wherein all of said at least four supports are wheels.

11. A movable platform as in claim 9 wherein two of said front support, said rear support and said center support are wheels, and wherein a remaining one of said front support, said rear support and said center support is a support that slides on said surface.

12. A movable platform as in claim 9 wherein each of said wheels is rigid and has a solid rubber tire mounted on the circumference thereof.

13. A movable platform as in claim 9 further comprising means for indicating relative positions of each of said wheels.

14. A movable platform as in claim 9 wherein said means for synchronizing comprises:
   a gear wheel coupled to each of said wheels for corresponding rotation therewith; and
   an endless loop coupled to each said gear wheel wherein rotation of each said gear wheel causes corresponding movement of said endless loop.

15. A movable platform for rolling movement on a hard surface having a contoured profile, comprising:
   a frame;
   at least four supports coupled to said frame and contacting said surface wherein said frame is supported above said surface;

a first three of said at least four supports being arranged in a linear alignment that defines a direction of travel for said frame, and a remainder of said at least four supports being spaced apart from said linear alignment;

said first three defined by a front support, a rear support and a center support centered between said front support and said rear support;

said center support being a floating support capable of substantially vertical movement;

a sensor coupled to said center support for measuring a vertical component of said substantially vertical movement and for generating a signal indicative thereof;

at least two of said front support, said rear support and said center support being wheels configured to roll in said direction of travel;

an odometer coupled to one of said wheels for measuring a distance traveled on said surface caused by each rotation of said one of said wheels and for generating a signal indicative of said distance traveled;

means coupled to said wheels for synchronizing rotation thereof when rolling on said surface wherein said distance traveled by said one of said wheels is the same for remaining ones of said wheels; and a processor mounted on said frame and coupled to said sensor and said odometer for determining the contoured profile of said surface along said direction of travel using said vertical component of said substantially vertical movement and said distance traveled.

16. A movable platform as in claim 15 wherein all of said at least four supports are wheels.

17. A movable platform as in claim 15 wherein two of said front support, said rear support and said center support are wheels, and wherein a remaining one of said front support, said rear support and said center support is a support that slides on said surface.

18. A movable platform as in claim 15 wherein each of said wheels is rigid and has a solid rubber tire mounted on the circumference thereof.

19. A movable platform as in claim 15 further comprising means for indicating relative positions of each of said wheels.

20. A movable platform as in claim 15 wherein said means for synchronizing comprises:

a gear wheel coupled to each of said wheels for corresponding rotation therewith; and an endless loop coupled to each said gear wheel wherein rotation of each said gear wheel causes corresponding movement of said endless loop.

* * * * *